Dec. 8, 1931.  W. B. MARTIN ET AL  1,835,606
SIRUP EVAPORATOR
Filed Aug. 8, 1929
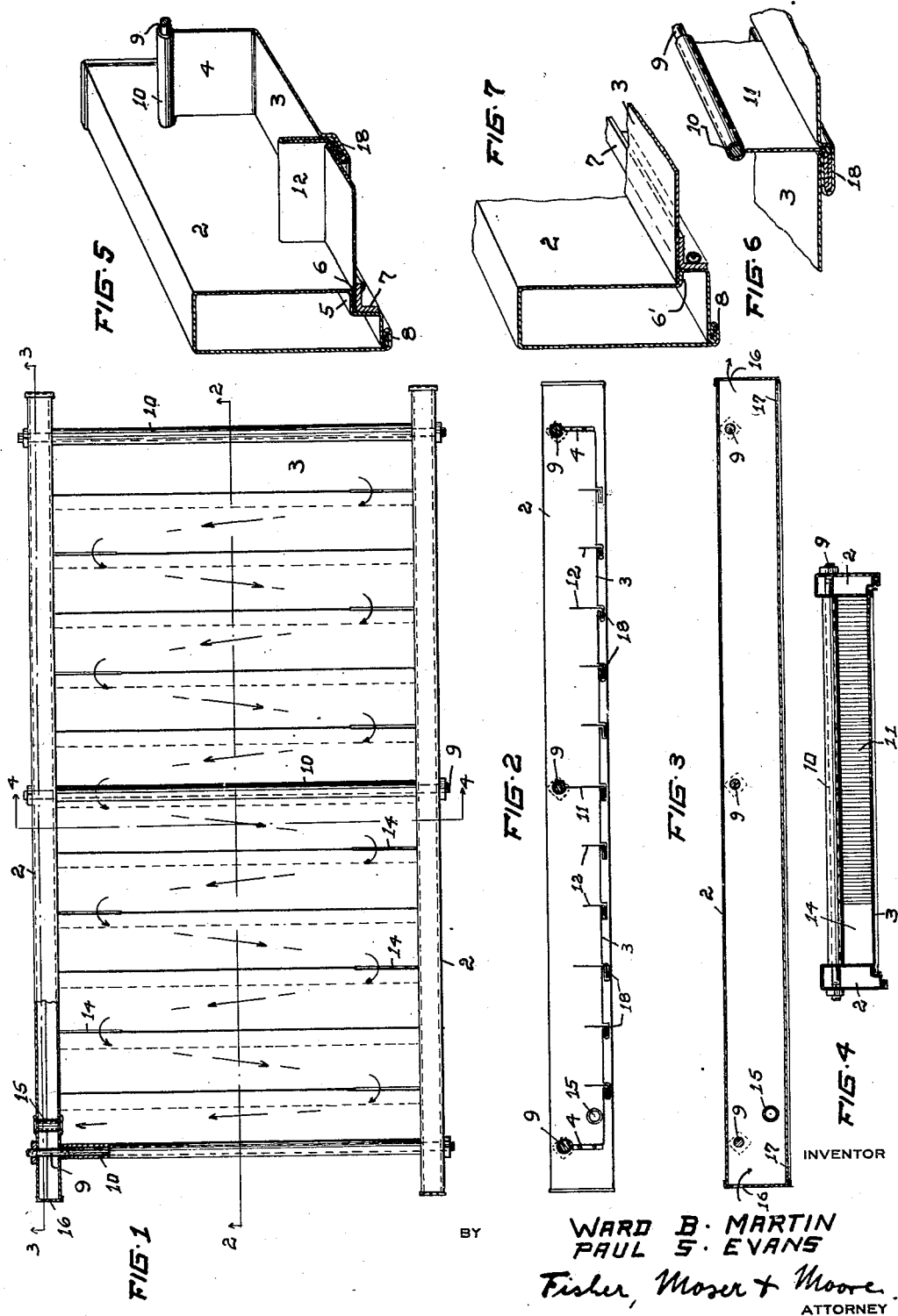
INVENTOR
WARD B. MARTIN
PAUL S. EVANS
Fisher, Moser + Moore
ATTORNEY Patented Dec. 8, 1931

1,835,606

UNITED STATES PATENT OFFICE

WARD B. MARTIN, OF GENEVA, OHIO, AND PAUL S. EVANS, OF MOBILE, ALABAMA, ASSIGNORS TO MOBILE STEEL COMPANY, OF MOBILE, ALABAMA, A CORPORATION OF ALABAMA

SIRUP EVAPORATOR

Application filed August 8, 1929. Serial No. 384,434.

Our invention relates to an improvement in sirup evaporators, and in general our object is to provide a durable and efficient evaporating pan of relatively light weight made entirely of sheet metal, substantially as herein shown and described and more particularly pointed out in the claims.

Thus, the pan includes tubular side walls to give rigidity and strength to the structure and to lighten its weight, and these tubular walls are provided with ventilating openings to permit the circulation of air therethrough and prolong the life of the pan, it being understood that such evaporating pans are exposed to fire and heat. The tubular side walls and bottom of the pan are also particularly constructed with a fluid tight joint adapted to withstand repeated exposure to heat, and to support the bottom in a stable and effective manner. The bottom is also sub-divided by cross walls and partitions seamed to the bottom in a special way, and tie rods are provided which not only brace the structure as a whole but also support the bottom through the medium of the cross walls or partitions aforesaid.

In the accompanying drawings, Fig. 1 is a plan or top view of our improved evaporating pan, a portion thereof being broken away and shown in section. Fig. 2 is a longitudinal section through the pan on line 2—2 of Fig. 1. Fig. 3 is a sectional view longitudinally through one of the tubular side walls of the pan on line 3—3 of Fig. 1. Fig. 4 is a sectional view transversely through the pan on line 4—4 of Fig. 1. Fig. 5 is a perspective and sectional view, enlarged, of a portion of the pan.

Fig. 6 is a perspective and sectional view of a portion of the tie rod and division wall which support the bottom centrally between the opposite ends of the pan. Fig. 7 is a perspective and sectional view of a modification.

The present evaporating pan is designed especially for the use of cane growers and sirup makers, and the pan is made in various sizes, for example, from six to fifteen feet long, depending upon the capacity per day desired. In use the pans are supported in a slightly horizontally-inclined position above a fire, and the bottom is exposed to the flames or direct heat. To facilitate handling and transportation it is desirable to make the larger pans as light in weight as possible, but inasmuch as the pans are also subjected to rough handling, heat, etc., the construction of the pan should be rigid and strong. To meet these requirements we have devised a pan having two hollow sheet metal side members 2—2 united to a third member 3 also made of sheet metal and referred to herein as the bottom member of the pan. The tubular sides or hollow side members 2 extend the full length of the pan somewhat beyond the upwardly-bent right-angular end walls 4—4 of bottom member 3. Each hollow side member 2 is rectangular in cross section and formed with an angular offset 5 in one corner edge thereof to provide a flat seat 6 of substantial width for a border portion of bottom member 3, see Fig. 5.

Solder or other sealing material may be used to provide a fluid-tight joint, and this joint is re-enforced and also protected from the heat by an angular strip 7 of metal, which may be affixed thereto by solder or in any mechanical way. In Fig. 7 the offset portion 6′ projects outwardly to provide a supporting ledge for member 3, and in Fig. 5 the offset 6 extends inwardly to provide a clamping or sealing face for member 3. The outer corner edge of side member 2 adjacent the offsets described comprises a seam 8, and this formation adds rigidity and strength to the side members. Thus these side members provide side walls for the pan which are light in weight and also rigid and strong to support the load. Moreover, these hollow side walls are tied together by several brace rods 9 which pass through the hollow sides and also through eyes or loops 10 formed at the upper edges of the end walls 4—4 and also in a partition or cross wall 11. This particular partition 11 is located in the present instance centrally between the ends of the pan, but obviously, it may be placed at other points and more than one may be used, especially in a longer pan. The tie rods also function to suspend the bottom member 3 from the stiffer side members and to support the load carried by the bottom, and they supplement the bracing effects on said bottom obtained by the use of a series of other cross walls or partitions 12 located at uniformly spaced intervals the full length of the pan. These partitions 12, and also the central partition 11, extend only part way across the pan, openings 14 being provided at opposite sides in alternating relation to produce a circuitous travel or flow of the sirup from one end of the pan to the other. The sirup is discharged through a ferrule or tube 15 in one of the hollow side walls near the one end of the pan, see Fig. 1. These hollow side walls are open, or have air openings 16 at their opposite ends, to promote the circulation of air therethrough. Drain openings 17 are also provided in the bottom portions of the hollow side members 2, although the drain openings may be omitted to permit liquid to be introduced into the side members should the side members be exposed directly to the heat. Customarily, these side members are supported on walls, but the pan may be supported otherwise.

Bottom member 3 is preferably made of sheet metal, galvanized or copper, and to avoid having openings therein and the use of solder, the partitions 11 and 12 are secured thereto by crimped seams 18. That is to say, the sheet metal of which bottom member 3 is composed is folded at intervals to provide transverse channels therein within which the sheet metal walls or partitions 11 and 12 are inserted and bent at right angles to a vertical plane against the flat bottom of member 3, substantially as delineated in Fig. 6. The partitions are thereby securely fastened to the bottom member, and the several folded plys of metal involved in the flattened seam or joint 18 stiffen and re-enforce the pan bottom.

What we claim is:

1. An evaporator pan, comprising hollow side members, an integral sheet metal bottom between said side members, vertical partitions secured to said bottom extending alternately from opposite sides of said side members part way across the pan to produce a sinuous non-leaking path in said evaporator pan, tie rods extending across said bottom and above the same between said side members, and means secured to said bottom between the ends thereof and at right angles to the hollow side members for suspending the bottom from said tie rods.

2. An evaporator pan, comprising hollow side members, an integral sheet metal bottom member secured to said side members having end walls formed with loops, a partition secured to said bottom member partly across the same to form a sinuous non-leaking path in said pan having a loop, and tie rods between said side members passing through said loops to tie the bottom and hollow side members together and to support and strengthen said bottom.

In testimony whereof we affix our signatures.

WARD B. MARTIN.
PAUL S. EVANS.